United States Patent [19]

Richardson et al.

[11] Patent Number: 5,714,947
[45] Date of Patent: Feb. 3, 1998

[54] VEHICLE COLLISION AVOIDANCE SYSTEM

[75] Inventors: David L. Richardson, Arlington Heights, Ill.; Raj Mittra, State College, Pa.; Leonard J. Kuskowski, Tower Lakes, Ill.

[73] Assignee: Northrop Grumman Corporation, Los Angeles, Calif.

[21] Appl. No.: 790,145

[22] Filed: Jan. 28, 1997

[51] Int. Cl.$^6$ ........................................ G08G 1/16
[52] U.S. Cl. ................. 340/903; 342/70; 343/761; 343/781 P; 343/781 CA; 367/907
[58] Field of Search ......................... 340/903, 435; 342/70, 71, 72; 343/781 P, 781 CA, 837, 839, 761; 367/909

[56] References Cited

U.S. PATENT DOCUMENTS

| | | | |
|---|---|---|---|
| 3,708,795 | 1/1973 | Lyons | 343/708 |
| 3,745,582 | 7/1973 | Karikomi et al. | 343/758 |
| 4,011,563 | 3/1977 | Robbi | 343/7 |
| 4,072,945 | 2/1978 | Katsumata et al. | 343/7 |
| 4,158,841 | 6/1979 | Wuchner et al. | 343/7 |
| 4,308,536 | 12/1981 | Sims, Jr. et al. | 343/7 |
| 4,519,469 | 5/1985 | Hayashi et al. | 180/169 |
| 4,658,385 | 4/1987 | Tsuji | 367/105 |
| 4,668,955 | 5/1987 | Smoll | 343/761 |
| 4,729,449 | 3/1988 | Holmquist | 180/168 |
| 4,757,450 | 7/1988 | Etoh | 364/426 |
| 4,916,450 | 4/1990 | Davis | 342/71 |
| 4,998,110 | 3/1991 | Davis | 342/70 |
| 5,023,617 | 6/1991 | Deering | 342/70 |
| 5,025,262 | 6/1991 | Abdelrazik et al. | 343/705 |
| 5,041,836 | 8/1991 | Paschen et al. | 342/375 |
| 5,266,955 | 11/1993 | Izumi et al. | 342/70 |
| 5,432,524 | 7/1995 | Sydor | 343/765 |
| 5,530,651 | 6/1996 | Uemura et al. | 340/435 |
| 5,546,086 | 8/1996 | Akuzawa et al. | 342/70 |

*Primary Examiner*—Jeffrey Hofsass
*Assistant Examiner*—Julie B. Lieu
*Attorney, Agent, or Firm*—Terry J. Anderson; Karl J. Hoch, Jr.

[57] ABSTRACT

A collision avoidance system for a vehicle has a vehicle steering sensor for sensing a direction in which the vehicle is being steered, a source of radiation, an articulated reflector for directing radiation from the source in a desired direction, an articulation mechanism for effecting articulation of the articulate reflector, and a close loop control circuit responsive to the vehicle steering sensor for controlling the articulation mechanism so as to cause the articulated reflector to direct radiation in a direction which is generally the same as that direction in which the vehicle is turning.

15 Claims, 2 Drawing Sheets

VEHICLE COLLISION AVOIDANCE SYSTEM

FIELD OF THE INVENTION

The present invention relates generally to radar systems and more particularly to a collision avoidance system for a vehicle, the system using a mechanically steered radar antenna to facilitate side-looking as the vehicle travels along a curve.

BACKGROUND OF THE INVENTION

Vehicle collision avoidance systems for preventing a moving vehicle from colliding with an obstacle are well known. It is also known to utilize radar and the like to determine the bearing and range of such obstacles, such that the vehicle may evade the obstacles by turning and or braking.

Such vehicle collision avoidance systems require that the radar beam be swept or steered from side to side, so as to determine the bearing of an obstacle. However, as those skilled in the art will appreciate, such contemporary means for effecting steering of the radar beam are complex and costly. Three examples of mechanisms for steering radar beams are provided in U.S. Pat. No. 3,745,582 issued on Jul. 10, 1973 to Karikomi et al. and entitled DUAL REFLECTOR ANTENNA CAPABLE OF STEERING RADIATED BEAMS; U.S. Pat. No. 5,025,262 issued on Jun. 18, 1991 to Avdelrazik et al. and entitled AIRBORNE ANTENNA AND A SYSTEM FOR MECHANICALLY STEERING AN AIRBORNE ANTENNA; and U.S. Pat. No. 5,432,524 issued on Jul. 11, 1995 to Sydor and entitled DRIVE ARRANGEMENT FOR MECHANICALLY-STEERED ANTENNAS.

It is clear that the techniques for steering a radar antenna, which are disclosed in the patents, have evolved directly from those commonplace in aerospace, where cost is much less of a concern than it is in the consumer marketplace. Thus, as will be appreciated from a review of U.S. Pat. Nos. 3,745,582, 5,025,262 and 5,432,524, such contemporary radar beam steering mechanisms are very complex and consequently too expensive for use in privately owned vehicles.

In view of the foregoing, it would be beneficial to provide a mechanically steered radar antenna for use in vehicle collision avoidance systems which is much less complex than contemporary steered radar antennas, and which is consequently much less expensive to manufacture.

SUMMARY OF THE INVENTION

The present invention specifically addresses and alleviates the above-mentioned deficiencies associated with the prior art. More particularly, the present invention comprises a collision avoidance system for a vehicle, the system having a vehicle steering sensor for sensing a direction in which the vehicle is being steered; a source of radiation; an articulated reflector for directing radiation from the source in a desired direction; an articulation mechanism for effecting articulation of the articulate reflector; and a closed loop control circuit responsive to the vehicle steering sensor for controlling the articulation mechanism so as to cause the articulated reflector to direct radiation in a direction which is generally the same as that direction in which the vehicle is turning.

The source of radiation comprises both a feed horn and a fixed reflector receiving radiation from the feed horn and directing the radiation onto the articulated reflector. The radiation preferably comprises microwave radiation, i.e., radar. The articulated reflector is preferably configured as a section of a paraboloid, with an elliptic outline.

The articulation mechanism is configured to effect rotation of the articulated reflector about a generally vertical axis and or to effect translation of the articulated reflector along a transverse axis of the vehicle. In any instance, movement (rotation and or translation) of the articulated reflector is such that it is capable of causing the microwave beam to be swept from right to left and back.

The vehicle steering sensor senses a direction in which a steering wheel has been turned. The closed loop control circuit comprises a microprocessor for controlling the direction in which the radiation is directed from the articulated reflector. In this manner, the radiation is accurately and reliably directed in the same direction that the car is being turned.

Thus, the vehicle collision avoidance system of the present invention prevents collision of a vehicle by sensing a direction in which the vehicle is being steered and directing radiation upon an articulated reflector which directs the radiation therefrom using position feedback to control the direction in which the radiation is directed therefrom, the direction being generally the same as the sensed direction in which the vehicle is being steered.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as description of the presently preferred embodiment of the invention and is not intended to represent the only form in which the present invention may be constructed or utilized. The description sets forth the functions and the sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
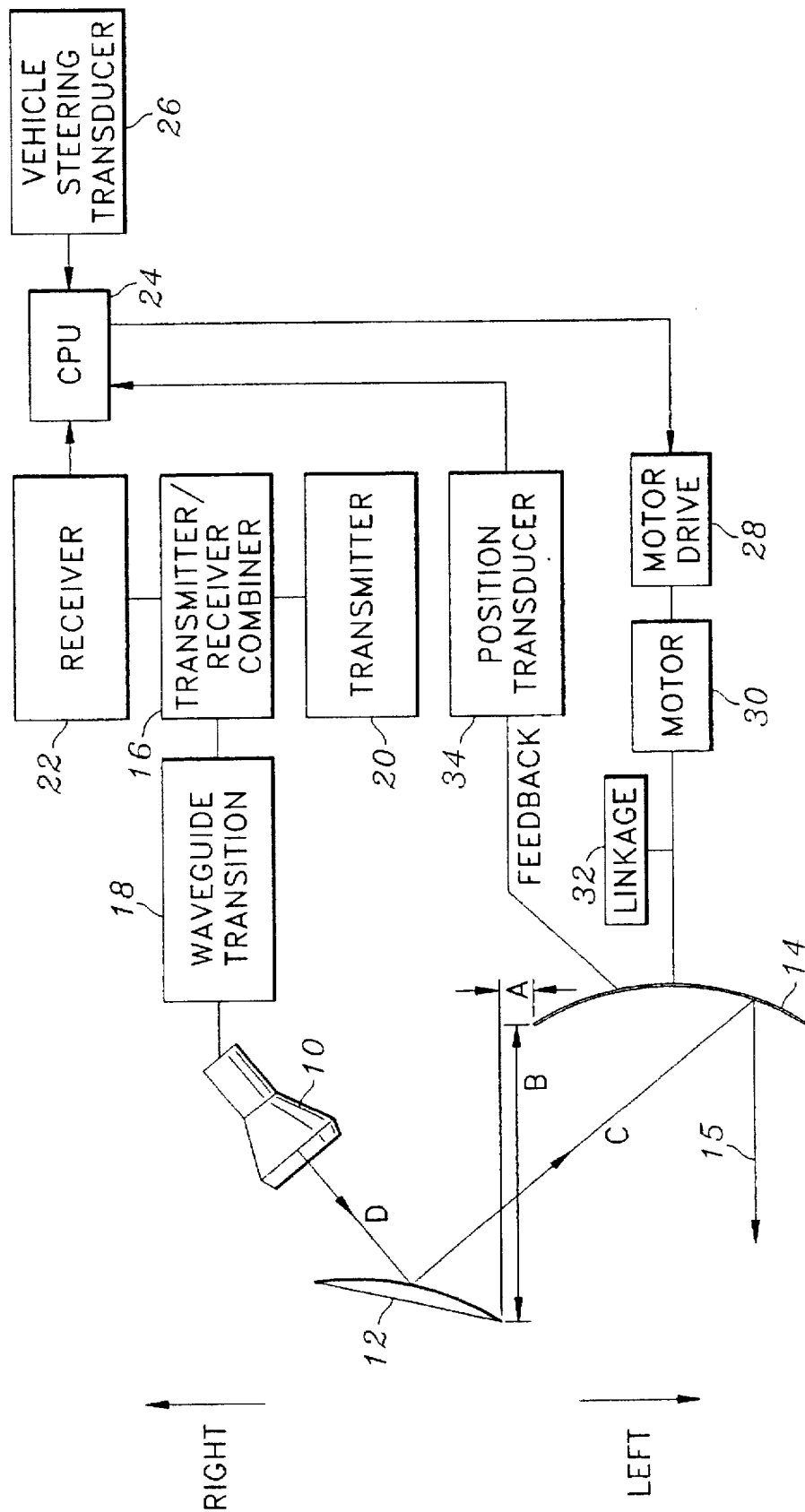
FIG. 1 is a block diagram of the collision avoidance system of the present invention showing the relative positions of the articulated reflector, fixed reflector, and feedhorn.
Figure 2:
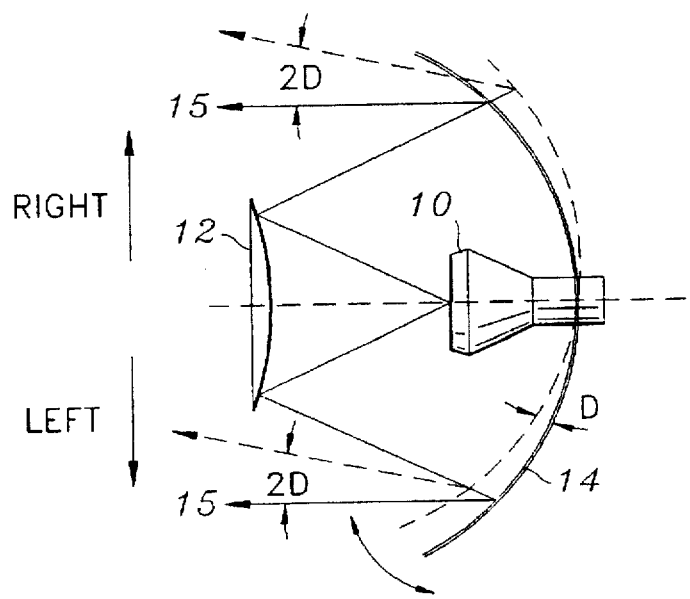
FIG. 2 is a schematic top view of the articulated reflector, fixed reflector, and feedhorn of FIG. 1, showing the relative positions thereof during rotation of the articulated reflector so as to effect beam steering.
Figure 3:
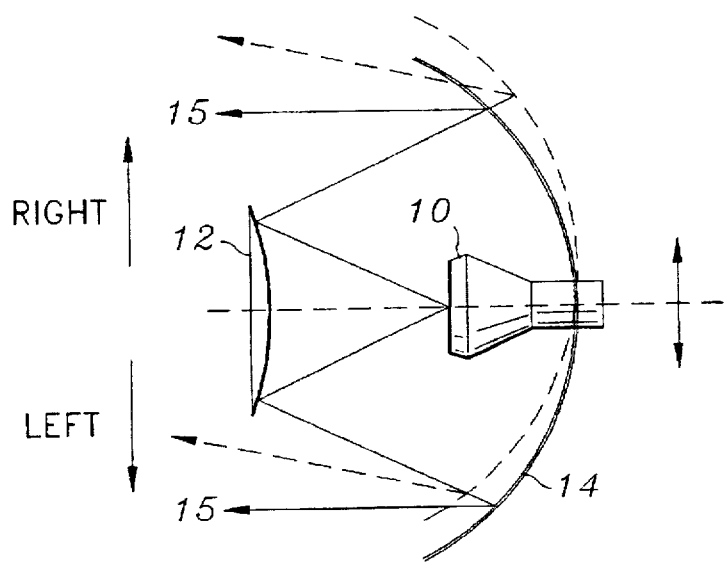
FIG. 3 is a top view of the articulated reflector, fixed reflector, and feedhorn of FIG. 1, showing the relative positions thereof during translation of the articulated reflector so as to effect beam steering.

The collision avoidance system of the present invention is illustrated in FIGS. 1–3 which depict a presently preferred embodiment of the invention. Referring now to FIG. 1, the collision avoidance system generally comprises a feedhorn 10 for generating radiation to be utilized in the detection of obstacles. According to the preferred embodiment of the present invention, the feedhorn 10 transmits microwave radiation, thereby defining the preferred embodiment of the present invention as a radar collision avoidance system. However, as those skilled in the art will appreciate, various different types of radiation, e.g., acoustic, light, etc., may likewise be utilized.

Thus, according to the present invention, microwave radiation from the feedhorn 10 is transmitted along path D to fixed reflector 12, from which it is focused toward articulated reflector 14, along path C. As those skilled in the art will appreciate, the sum of the lengths of paths C and D is approximately equal to the focal length of the parabolic articulated reflector 14, so as to facilitate effective transmission and reception of the radar signals.

As discussed in further detail below, articulated reflector 14 moves so as to effect steering of the radar beam reflected therefrom, generally such that the transmitted radar beam 15 is directed in the same direction that the vehicle is travelling. Dimension A (FIG. 1) is the clearance necessary between the articulated reflector 14 and the fixed reflector 12 to assure that the fixed reflector 12 does not interfere with the microwave radiation from articulated reflector 14.

The signal to be transmitted is generated via transmitter 20 and travels through transmitter receiver combiner 16 which facilitates the simultaneous transmission and reception of radar signals according to well known principles. From the transmitter receiver combiner 16, the radar signal travels through wave guide transition 18 to the feedhorn 10.

Received radar signals, i.e., those reflected from obstacles, are reflected by the articulated reflector 14 to the fixed reflector 12 and into the feedhorn 10. From the feedhorn 10, such received radar signals travel through wave guide transition 18 to transmitter receiver combiner 16, from which they are directed to receiver 22. From the receiver 22, a signal representative of the size and bearing of the obstacle is transmitted to CPU 24 which is then utilized to effect the evasive control, i.e., steering and/or braking, of the vehicle, according to well known principles.

The CPU 24 also receives an output from the vehicle steering transducer 26, so as to effect control of the articulated reflector 14. The articulated reflector 14 is moved so as to steer the transmitted radar signal 15 such that the transmitted radar signal 15 is generally directed in the direction in which the vehicle is travelling. For example, if the vehicle is turning left, then the articulated reflector 14 will direct the transmitted radar signal 15 to the left, so as to facilitate the identification of any obstacles which may be encountered by the vehicle in that direction. The sharper the vehicle is turned to the left, for example, the sharper the articulated reflector 14 directs the transmitted radar beam 15 to the left. In this manner, the likelihood of detecting obstacles in the path of the moving vehicle is enhanced.

The CPU 24 utilizes the vehicle steering transducers 26 output so as to generate a signal in response thereto for causing the motor drive 28 to drive the motor 30, via linkage 32, in a manner which causes the articulated reflector 14 to direct the transmitted radar beam 15 in the desired direction.

Thus, according to the present invention, the transmitted radar beam 15 is directed in generally the same direction as the vehicle travels, even when the vehicle is making a turn.

As discussed in detail below, the articulated reflector 14 may either be rotated or translated, so as to effect such desirable directing of the transmitted radar beam 15.

Referring now to FIG. 2, rotation of the articulated radar reflector 14 is illustrated. According to one configuration of the present invention, the articulated reflector 14 rotates about a generally vertical axis 17, such as that generally at the center thereof, so as to effect steering of the transmitted radar beam 15.

As those skilled in the art will appreciate, a given rotation of the articulated reflector 14 results in twice that much deflection of the transmitted radar beam 15, e.g., a 1° rotation of the articulated reflector results in a 2° deflection of the transmitted radar beam 15.

In this manner, the transmitted radar beam 15 may be directed to the left (a counter-clockwise rotation), or to the right (a clockwise rotation, as shown), such that it generally corresponds to the direction of travel, even when the vehicle is turning.

Alternatively, the transmitted radar beam 15 may be caused to sweep continuously back and forth, from left to right and back again, so as to constantly provide an indication of the presence of obstacles both ahead and to the sides.

Such rotation of the articulated antenna 14 may be accomplished via either a linear motor or actuator or via a conventional rotary motor, as well as the appropriate linkage, according to well known principles.

Referring now to FIG. 3, the articulated reflector 14 may alternatively be translated, i.e., moved in a generally linear fashion from left to right or right to left, so as to effect such steering of the transmitted radar beam 15. As those skilled in the art will appreciate, translation of the articulated antenna 14 results in the displacement of the feed horn 10 from the axis of the articulated reflector 14, causing the beam to change direction. For example, if the articulated reflector 14 is moved to the right as shown, then the transmitted radar beam 15 is directed to the right.

As those skilled in the art will appreciate, the articulated reflector 14 may thus be moved either via rotation, translation, or a combination thereof, so as to effect the desired steering of the transmitted radar beam 15.

Thus, according to the present invention, radar or the like is provided with a mechanically steered antenna so as to facilitate collision avoidance and intelligent cruise control for ground based vehicles such as cars, trucks, motorcycles, and the like. According to the present invention, the antenna facilitates the detection of obstacles both straight ahead and to the sides of the vehicle, particularly as the vehicle is executing a turn.

The articulated reflector is preferably configured as an elliptic paraboloid according to the formula:

$$z=f((x/b)^2+(y/b)^2) \leq c \text{ where } f=\text{focal length, } b=\text{radius, } c=\text{height.}$$

The size of the articulated reflector 14 is reduced somewhat, so as to make it compatible with use in ground base vehicles, by removing a portion of the paraboloid. This is accomplished by removing that portion of the paraboloid which is bounded by the elliptical cylinder:

$$(x/d)^2+((y-e)/d)^2=1$$

where d=radius of the selection, e=offset from center.

The gain of the resulting antenna is determined by the formula:

$$G=4\pi a/\lambda^2 \text{ where } a=\pi d^2 \text{ area, } \lambda=\text{wavelength.}$$

As mentioned above, Dimension A is a mechanical clearance between the articulated reflector 14 and the fixed reflector 12. Dimension A provides clearance between the articulated reflector 14 and the fixed reflector 12, so as to prevent mechanical interference during movement of the articulated reflector 14 and also so as to provide a clear field of view during transmission and reception of radar signals by the articulated reflector 14. The requirement that Dimension A be greater than 0 necessitates that the articulated reflector define a partial section of a parabolic dish.

The fixed reflector 12 is preferably defined by a section of a hyperboloid. It is positioned and configured so as to assure that dimension A is greater than 0 and is disposed within the paraboloid articulated reflectors 14 focal length according to the formula:

$$(z'/f)^2-(x'/g)^2-(y'/g)^2=1$$

The prime notation indicates new coordinates, f and g are constants.

The feedhorn 10 is the input output element for the radar subsystem. The antenna pointing angle is 0° when the feedhorn 10 is located at the focus of the main reflector. The feedhorn 10 and the fixed reflector 12 cooperate to define a folded, or Cassegrain style feed for the articulated reflector 14. The articulated reflectors 14 axis is the line from the center of the feedhorn to the fixed reflector 12 and then to the articulated reflector 14.

According to the present invention, the transmitter/receiver combiner 16 facilitates the sharing of a single antenna system, i.e., the feedhorn 10, the fixed reflector 12 and the articulated reflector 14, for both reception and transmission of the radar beam, thereby reducing the cost and providing for a more efficient packaging of the collision avoidance system of the present invention.

The wave guide transition 18 between the feedhorn 10 and the transmitter/receiver combiner 16 provides efficient signal transfer from the coaxial cable, microstrip transmission line, or co-planar transmission line in the transmitter/receiver combiner to the wave guide of the feedhorn 10. Of course, this transition is bidirectional.

The motor subsystem consists of the CPU 24, the motor drive 28, motor 30, mechanical linkage 32 to the articulating reflector 14, and vehicle steering transducer 26. The steering signal originates from one or more sensors associated with the vehicle's steering linkage. Such sensor(s) sense the orientation of the steering wheel or wheels of the vehicle, so as to provide an indication of the direction in which the vehicle is heading, i.e., straight ahead or turning. The CPU 24 receives the steering signal from the vehicle's steering transducer 26 and the output from the radar receiver 22 and calculates the pointing angle therefrom. The output from the CPU 24 is applied to the motor drive 28 which converts the digital signal from the CPU 24 into an analog signal suitable for driving the motor 30. The analog drive signal is applied to the motor 30 so as to effect desired movement of the articulated reflector 14.

As those skilled in the art will appreciate, either stepping or continuous motors may be utilized to effect either rotational translation of the articulated reflector. The motor is preferably reversible.

As the vertex of the articulated reflector 14 is rotated θ, the resulting antenna angle is varied by Δ=2θ. As the articulated reflector 14 is moved along a line perpendicular to the vertex by a distance B, the resulting change in antenna angle Δ is approximately equal to arcsin (D/F), where F is the focal length of the articulated antenna 14. Maximum gain and minimum sidelobes are obtained for Δ=0. As those skilled in the art will appreciate, when the reflector is moved from the focal point, the performance degrades. It has been found that the performance of the present invention is acceptable for Δ≦±3 beamwidths in the vehicle application (beamwidth is −3 dB of antenna boresight).

The position of the articulated reflector 14 is sensed by position transducer 34, which provides an output to the CPU, so as to facilitate closed loop feedback control of the position of the articulated reflector 14, thereby enhancing the accuracy with which such directional control is provided. The position transducer 34 preferably converts position to a voltage applies this voltage to the CPU, which then converts the voltage to a digital form and then calculates an error correction signal which is then fed back to the articulated reflector 14 via the motor drive 28, motor 30 and linking, according to well known principles.

Thus, according to the present invention, the path from the CPU 24 to the position transducer 34 is a closed loop feedback circuit.

Alternatively, the CPU 24 may point the articulated antenna 14 based upon information provided in the return radar signal, such as when angle scan is based upon signal power, according to well known principles.

According to the preferred embodiment of the present invention, the transmitter 20 provides a carrier frequency of 77 gHz. The main reflector is approximately 10 cm across its longest dimension and the subreflector is approximately 2 cm in diameter. Distance A is approximately 1 cm, so as to provide the desired clearance between the fixed reflector 12 and the articulated reflector 14.

It is understood that the exemplary method for collision avoidance system described herein and shown in the drawings represents only a presently preferred embodiment of the invention. Indeed, various modifications and additions may be made to such embodiment without departing from the spirit and scope of the invention. For example, the shape and or configuration of the articulated reflector 14 may be varied, so as to accommodate desired packaging within a particular vehicle. Thus, portions of the periphery of the paraboloid thereof may be omitted or cut away, so as to obtain desired clearance to facilitate the necessary motion thereof for directing the radar beam. In this manner, the shape of the articulated reflector 14 may be varied so as to prevent it from contacting nearby vehicle components as it moves. Additionally, as mentioned above, various types of radiation, acoustic, laser, etc., may be utilized according to the present invention.

Thus, these and other modifications and additions may be obvious to those skilled in the art and may be implemented to adapt the present invention for use in a variety of different applications.

What is claimed is:

1. A collision avoidance system for a vehicle, the system comprising:

a) a vehicle steering sensor for sensing a direction in which the vehicle is being steered;

b) a source of radiation;

c) an articulated reflector for directing radiation from the source in a desired direction;

d) an articulation mechanism for effecting articulation of the articulate reflector; and e) a closed loop control circuit responsive to the vehicle steering sensor for controlling the articulation mechanism so as to cause the articulated reflector to direct radiation in a direction which is generally the same as that direction in which the vehicle is turning.

2. The collision avoidance system as recited in claim 1 wherein said source of radiation comprises:

a) a feed horn; and b) a fixed reflector receiving radiation from the feed horn and directing the radiation onto the articulated reflector.

3. The collision avoidance system as recited in claim 1 wherein the radiation comprises microwave radiation.

4. The collision avoidance system as recited in claim 1 wherein the articulated reflector is configured as a elliptic paraboloid.

5. The collision avoidance system as recited in claim 1 wherein the articulation mechanism is configured to effect rotation of the articulated reflector about a generally vertical axis.

6. The collision avoidance system as recited in claim 1 wherein the articulation mechanism is configured to effect translation of the articulated reflector along a transverse axis of the vehicle.

7. The collision avoidance system as recited in claim 1 wherein the vehicle steering sensor senses a direction in which a steering wheel has been turned.

8. The collision avoidance system as recited in claim 1 wherein the closed loop control circuit comprises a microprocessor.

9. A method for avoiding collision of a vehicle, the method comprising the steps of:

a) sensing a direction in which the vehicle is being steered;

b) directing radiation upon an articulated reflector;

c) articulating the articulated reflector so as to direct the radiation therefrom; and d) using position feedback to control the direction in which the radiation is directed from the articulated reflector, the direction being generally the same as the sensed direction in which the vehicle is being steered.

10. The method as recited in claim 9 wherein the step of directing radiation upon an articulated reflector comprises directing radiation from a feedhorn to the articulated reflector via a fixed reflector.

11. The method as recited in claim 9 wherein the step of directing radiation comprises directing microwave radiation.

12. The method as recited in claim 9 wherein the step of articulating the articulated reflector comprises rotating the articulated reflector about a generally vertical axis.

13. The method as recited in claim 9 wherein the step of articulating the articulated reflector comprises translating the articulated reflector along a transverse axis of the vehicle.

14. The method as recited in claim 9 wherein the step of sensing a direction in which the vehicle is being steered comprises sensing a direction in which a steering wheel has been turned.

15. The method as recited in claim 9 wherein the step of controlling the direction in which the radiation is directed from the articulated reflector comprises performing closed loop control utilizing a microprocessor.

* * * * *